US011353835B2

(12) United States Patent
Kobayashi et al.

(10) Patent No.: US 11,353,835 B2
(45) Date of Patent: Jun. 7, 2022

(54) PLANT OPERATION SUPPORT APPARATUS, PLANT OPERATION SUPPORT METHOD, AND PLANT OPERATION SUPPORT PROGRAM RECORDING MEDIUM

(71) Applicant: YOKOGAWA ELECTRIC CORPORATION, Tokyo (JP)

(72) Inventors: Ryousuke Kobayashi, Tokyo (JP); Makoto Nakaya, Tokyo (JP); Ryosuke Kashiwa, Tokyo (JP); Shin Ishimaru, Tokyo (JP); Azusa Takenaka, Tokyo (JP); Naoto Takano, Tokyo (JP)

(73) Assignee: Yokogawa Electric Cornoration, Tokyo (JP)

( * ) Notice: Subject to any disclaimer, the term of this patent is extended or adjusted under 35 U.S.C. 154(b) by 553 days.

(21) Appl. No.: 15/861,181

(22) Filed: Jan. 3, 2018

(65) Prior Publication Data
US 2018/0196400 A1   Jul. 12, 2018

(30) Foreign Application Priority Data
Jan. 12, 2017 (JP) .............................. JP2017-002973

(51) Int. Cl.
*G05B 17/02* (2006.01)
*G06Q 50/06* (2012.01)
*G06Q 10/06* (2012.01)

(52) U.S. Cl.
CPC ....... *G05B 17/02* (2013.01); *G06Q 10/06393* (2013.01); *G06Q 50/06* (2013.01)

(58) Field of Classification Search
CPC ... G05B 17/02; G06Q 50/06; G06Q 10/06393
See application file for complete search history.

(56) References Cited

U.S. PATENT DOCUMENTS

| 2005/0240382 A1 | 10/2005 | Nakaya et al. |
| 2011/0183303 A1* | 7/2011 | Yamamoto ............. G09B 25/02 434/219 |
| 2012/0278204 A1 | 11/2012 | Urano et al. |
| 2013/0030555 A1 | 1/2013 | Starr et al. |
| 2013/0080200 A1 | 3/2013 | Connolly et al. |

(Continued)

FOREIGN PATENT DOCUMENTS

| JP | 11-039029 A | 2/1999 |
| JP | 2002-132340 A | 5/2002 |

(Continued)

*Primary Examiner* — Bijan Mapar
(74) *Attorney, Agent, or Firm* — Sughrue Mion, PLLC

(57) ABSTRACT

Provided is a plant operation support apparatus including a plant simulator, a predictor, and a predicted KPI deriver. The plant simulator simulates a state at a current time or a predetermined time of a plant based on information obtained from the plant, to output an estimated value at the current time or the predetermined time of process data in the plant. The predictor predicts a state at a predetermined future time of the plant based on the estimated value and outputs a predicted value of the process data in the plant. The predicted KPI deriver derives a predicted KPI which is an index for monitoring the state at the future time of a task to be monitored in plant operation based on the predicted value.

12 Claims, 7 Drawing Sheets

(56) References Cited

U.S. PATENT DOCUMENTS

| | | | |
|---|---|---|---|
| 2013/0116830 A1* | 5/2013 | D'Amato | H02J 3/00 700/275 |
| 2013/0147630 A1 | 6/2013 | Nakaya et al. | |
| 2014/0016790 A1* | 1/2014 | Loud | G10K 11/17875 381/57 |
| 2015/0160630 A1 | 6/2015 | Makishima et al. | |
| 2015/0317591 A1 | 11/2015 | Pantaleano et al. | |
| 2016/0364510 A1 | 12/2016 | Kashiwa et al. | |

FOREIGN PATENT DOCUMENTS

| | | | |
|---|---|---|---|
| JP | 2007-115176 A | 5/2007 |
| JP | 4789277 B2 | 10/2011 |
| JP | 2012229088 A | 11/2012 |
| JP | 2013025340 A | 2/2013 |
| JP | 2013-080354 A | 5/2013 |
| JP | 2014-507721 A | 3/2014 |
| JP | 5522491 B2 | 6/2014 |
| JP | 2014167706 A | 9/2014 |
| JP | 2014532230 A | 12/2014 |
| JP | 2015-114778 A | 6/2015 |
| JP | 2017-004278 A | 1/2017 |

* cited by examiner ly maintain safety and production efficiency in plant operation. In the
PLANT OPERATION SUPPORT APPARATUS, PLANT OPERATION SUPPORT METHOD, AND PLANT OPERATION SUPPORT PROGRAM RECORDING MEDIUM

CROSS-REFERENCE TO RELATED APPLICATION

This application claims priority from Japanese Patent Application No. 2017-002973 filed with the Japan Patent Office on Jan. 12, 2017, the entire content of which is hereby incorporated by reference.

BACKGROUND

1. Technical Field

The present disclosure relates to a plant operation support apparatus, a plant operation support method, and a plant operation support program recording medium.

2. Description of the Related Art

Conventionally, in a plant which performs petroleum refining, petrochemical process, water treatment process of water and sewage, and the like, the following operation support apparatus is sometimes used to optimally maintain safety and production efficiency in plant operation. In the operation support apparatus, a state of a future process is predicted based on process data obtained from field devices arranged in the plant.

The plant operation support apparatus using a process simulator as described above is disclosed in, for example, Japanese Patent No. 4789277, Japanese Patent No. 5522491, and JP-A-2017-004278. In a technique described in Japanese Patent No. 4789277, a trend graph displaying an estimated value reflecting actual measured values of process data and a predicted value of future process data which are graphed in time series is generated.

In a technique described in Japanese Patent No. 5522491, an alarm at a current value is displayed. Further, an alarm at an estimated value based on a current value and an alarm at a predicted value possibly output in future are displayed using a process simulator.

Furthermore, in a technique described in JP-A-2017-004278, a trend graph displaying a prediction result, in which transient states of the process data are predicted and graphed in time series, is generated in order to realize a limit operation of the plant.

SUMMARY

A plant operation support apparatus according to embodiments of the present disclosure includes a plant simulator, a predictor, and a predicted KPI deriver. The plant simulator simulates a state at a current time or a predetermined time of a plant based on information obtained from the plant, to output an estimated value at the current time or the predetermined time of process data in the plant. The predictor predicts a state at a predetermined future time of the plant based on the estimated value and outputs a predicted value of the process data in the plant. The predicted KPI deriver derives a predicted KPI which is an index for monitoring the state at the future time of a task to be monitored in plant operation based on the predicted value.

DESCRIPTION OF THE EMBODIMENTS

Figure 1:
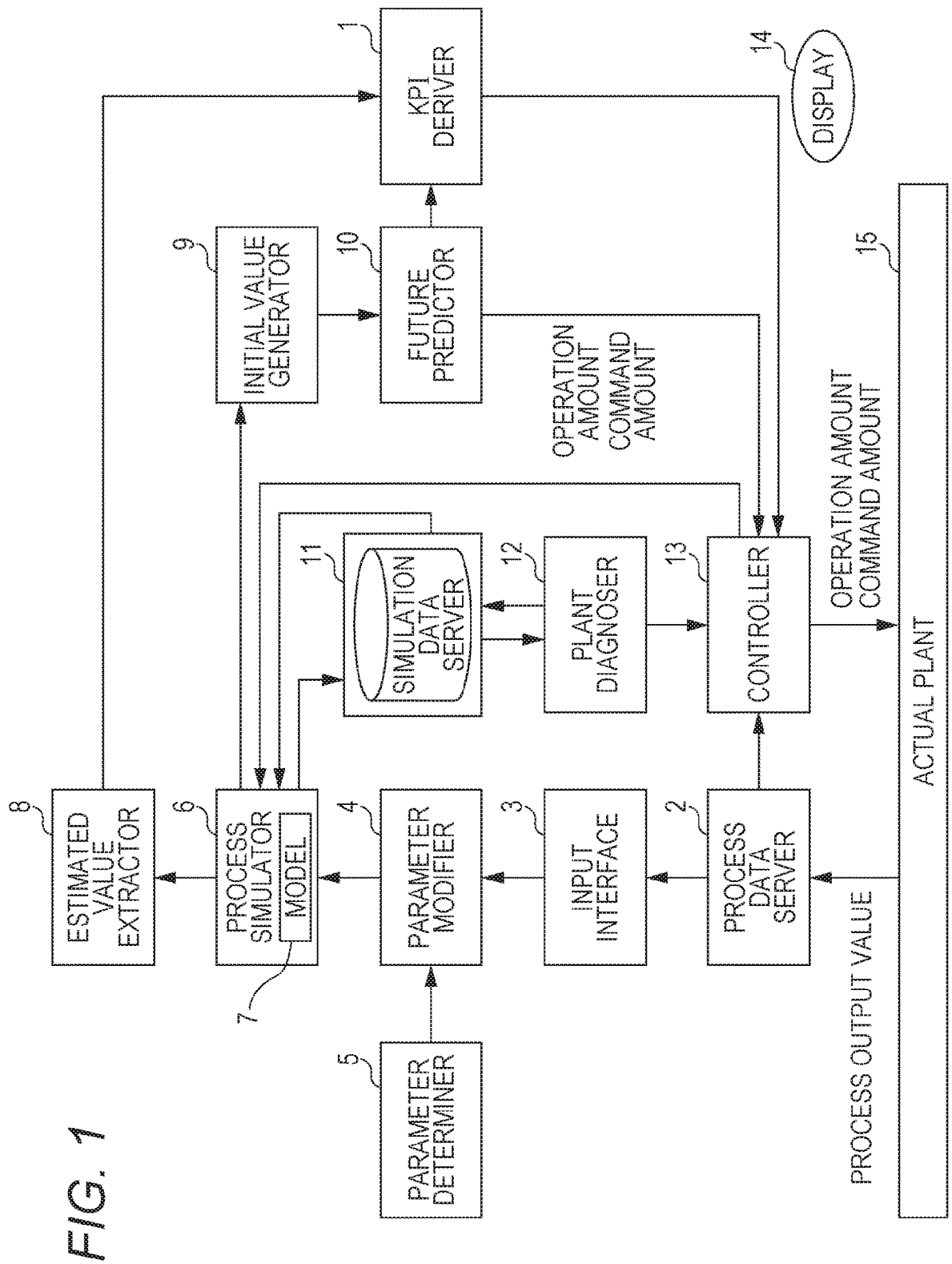
FIG. 1 is a configuration explanatory diagram showing a plant operation support apparatus according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the technique described in Japanese Patent No. 4789277, an operator who monitors operations of a plurality of field devices in the plant can understand process data of each measurement point by displaying the estimated value or the predicted value on a behavior of the process data in a time series trend graph. However, it has been difficult for the operator to intuitively understand at a glance a wide range of operation states of the plant such as safety, quality, production amount, and production efficiency from the present to the future. Thus, the operator has selected the process data necessary to understand the operation state of the plant, to finally decide on the safety and quality from a plurality of trend data. Therefore, monitoring burden on the operator increases, and the decision depends on skill of the operator. Therefore, there has been a possibility that misunderstanding of the operation state of the plant, delay in handling, and the like are caused.

In the technique described in Japanese Patent No. 5522491, it is possible to recognize alarms which may be output on each field device now and in future. However, related data is not managed on a screen for each task of the plant. Thus, when a plurality of tasks is performed, it is difficult to immediately determine which alarm is related to which task. Therefore, as in Japanese Patent No. 4789277, the operator handles the alarms while selecting an important alarm out of a large amount of alarm information. Therefore, the monitoring burden on the operator increases, and there has been a possibility that misunderstanding of the operation state of the plant, delay in handling, and the like are caused.

In the technique described in JP-A-2017-004278, simulation in the transient state is possible. However, it is difficult to intuitively understand the operation state of the entire plant such as safety, quality, production volume, and production efficiency.

An object of the present disclosure is to realize the following plant operation support apparatus. The plant operation support apparatus makes it possible to intuitively confirm the operation state in the plant by calculating current and future KPIs (Key Performance Indicator) for each task in the plant.

In order to solve the above-described problem, a plant operation support apparatus disclosed in the present disclosure includes a plant simulator, a predictor, and a predicted KPI deriver. The plant simulator simulates a state at a current time or a predetermined time of a plant based on information obtained from the plant, to output an estimated value at the current time or the predetermined time of process data in the plant. The predictor predicts a state at a predetermined future time of the plant based on the estimated value and outputs a predicted value of the process data in the plant. The predicted KPI deriver derives a predicted KPI which is an index for monitoring the state at the future time of a task to be monitored in plant operation based on the predicted value.

Further, the predicted KPI deriver may derive the each predicted KPI at a plurality of future times and display the resulting derived each predicted KPI.

Further, the following may be included: an estimated KPI deriver for deriving an estimated KPI which is an index for monitoring a state at the current time or the predetermined time of the task based on the estimated value; a KPI delta calculator for calculating a delta between the estimated KPI and the predicted KPI; and a KPI determiner for determining that a state at the future time of the task is normal when the delta is within a predefined range from a first threshold value to a second threshold value, and for determining that the state at the future time of the task is abnormal when the delta is out of the predefined range from the first threshold value to the second threshold value.

Further, a KPI determiner may be included. The KPI determiner is for determining that a state at the future time of the task is normal when the predicted KPI is within a predefined range from a first threshold value to a second threshold value, and for determining that the state at the future time of the task is abnormal when the predicted KPI is out of the predefined range from the first threshold value to the second threshold value.

Furthermore, when the KPI determiner determines that a state of the task is abnormal, the KPI determiner may determine a degree of abnormality corresponding to a magnitude of the predicted KPI or an absolute value of a difference between the delta and a threshold value close to the delta or a value of the predicted KPI among the first threshold value or the second threshold value.

Further, a display may be included. The display is for displaying a determination result at a plurality of future times as a predetermined symbol data based on the determination result determined by the KPI determiner, and for displaying the each delta or the each predicted KPI at the plurality of future times in time series in a graph form.

The estimated KPI or the predicted KPI may be calculated from one or a plurality of predetermined parameters necessary to evaluate the state of the task among the estimated value or the predicted value.

In order to solve the above-described problem, a first method of supporting plant operation of the present disclosure includes: simulating a state at a current time or a predetermined time of a plant based on information obtained from the plant by a plant simulator and outputting an estimated value at the current time or the predetermined time of data of the plant, predicting a state at a predetermined future time of the plant based on the estimated value by a predictor and outputting a predicted value of the data of the plant, deriving an estimated KPI which is an index for monitoring a state at the current time or the predetermined time of the task based on the estimated value by an estimated KPI deriver, deriving a predicted KPI which is an index for monitoring the state at the predetermined future time of a task to be monitored in plant operation based on the predicted value by a predicted KPI deriver, calculating a delta between the estimated KPI and the predicted KPI by a KPI delta calculator, and determining that the state at the predetermined future time of the task is normal by a KPI determiner when the delta is within a predefined range from a first threshold value to a second threshold value, and determining that the state at the predetermined future time of the task is abnormal by the KPI determiner when the delta is out of the predefined range from the first threshold value to the second threshold value.

In order to solve the above-described problem, a second method of supporting plant operation of the present disclosure includes: simulating a state at a current time or a predetermined time of a plant based on information obtained from the plant by a plant simulator and outputting an estimated value at the current time or the predetermined time of data of the plant, predicting a state at a predetermined future time of the plant based on the estimated value by a predictor and outputting a predicted value of the data of the plant, deriving a predicted KPI which is an index for monitoring the state at the predetermined future time of a task to be monitored in plant operation based on the predicted value by a predicted KPI deriver, and determining that the state at the predetermined future time of the task is normal by a KPI determiner when the predetermined KPI is within a predefined range from a first threshold value to a second threshold value, and determining that the state at the predetermined future time of the task is abnormal by the KPI determiner when the predetermined KPI is out of the predefined range from the first threshold value to the second threshold value.

In order to solve the above-described problem, in a computer-readable non-transitory first program recording medium of the present disclosure, a program for performing the following steps by a computer is recorded: a step of simulating a state at a current time or a predetermined time of a plant based on information obtained from the plant by a plant simulator and outputting an estimated value at the current time or the predetermined time of data of the plant; a step of predicting a state at a predetermined future time of the plant based on the estimated value by a predictor and outputting a predicted value of the data of the plant; a step of deriving an estimated KPI which is an index for monitoring a state at the current time or the predetermined time of the task based on the estimated value by an estimated KPI deriver, a step of deriving a predicted KPI which is an index for monitoring a state at the predetermined future time of a task to be monitored for plant operation based on the predicted value by a predictive KPI deriver; a step of calculating a delta between the estimated KPI and the predicted KPI by a KPI delta calculator; and a step of determining that a state at the predetermined future time of the task is normal by a KPI determiner when the delta is within a predefined range from a first threshold value to a second threshold value, and determining that a state in the predetermined future time of the task is abnormal by the KPI determiner when the delta is out of the predefined range from the first threshold value to the second threshold value.

In order to solve the above-described problem, in a computer-readable non-transitory second program recording medium of the present disclosure, a program for performing the following steps by a computer is recorded: a step of simulating a state at a current time or a predetermined time of a plant based on information obtained from the plant by a plant simulator and outputting an estimated value at the current time or the predetermined time of data of the plant; a step of predicting a state at a predetermined future time of the plant based on the estimated value by a predictor and outputting a predicted value of the data of the plant; a step of deriving a predicted KPI which is an index for monitoring a state at the predetermined future time of a task to be monitored for plant operation based on the predicted value by a predictive KPI deriver; and a step of determining that a state at the predetermined future time of the task is normal by a KPI determiner when the predicted KPI is within a predefined range from a first threshold value to a second threshold value, and determining that a state in the predetermined future time of the task is abnormal by the KPI determiner when the predicted KPI is out of the predefined range from the first threshold value to the second threshold value.

According to the present disclosure, the plant operation support apparatus includes a predicted KPI deriver in addition to a plant simulator and a predictor. Here, the plant simulator simulates a current state of the plant based on information obtained from the plant, to output a current estimated value of the process data in the plant. The predictor predicts a future state of the plant based on the estimated value and outputs the predicted value of the process data in the plant. Based on the predicted value, the predicted KPI deriver derives a predicted KPI which is an index for monitoring a state in a predetermined future time of a task to be monitored for plant operation. This makes it possible to intuitively understand the operation state of the entire plant such as safety, quality, production amount, production efficiency as KPI. Therefore, the monitoring burden on the operator is reduced. As a result, it is possible to solve problems such as misunderstanding of the operation state of the plant and delay in handling.

Hereinafter, the plant operation support apparatus according to the present disclosure will be described in detail with reference to the drawings.

<Description of an Example of Configuration of Plant Operation Support Apparatus and Each Main Part>

FIG. 1 is a configuration explanatory diagram showing an embodiment of the plant operation support apparatus of the present disclosure. This figure shows an outline of the plant operation support apparatus. In FIG. 1, the plant operation support apparatus mainly includes a process data server 2, an input interface 3, a parameter modifier 4, a parameter determiner 5, a process simulator 6, a process simulation model 7, a simulation data server 11, a plant diagnoser 12, a controller 13, an initial value generator 9, a future predictor 10, a KPI deriver 1, an estimated value extractor 8, and a display 14.

In FIG. 1, the process data server 2 is a server for storing the process data and actual measured value data obtained by an actual plant 15 in time series together with time data received by the process data server 2. This server includes a computer, a workstation and the like. The process data server 2 transmits the stored process data, actual measured value data, and parameters to the input interface 3. The process data server 2 may exist in a local network or in a system for realizing cloud computing via the Internet.

The input interface 3 converts the process data obtained from the actual plant 15 and stored in the process data server 2 in time series into a simulatable data format by the process simulator 6. The input interface 3 transmits the converted data to the parameter modifier 4.

The simulation data server 11 is a server for storing, in time series, a result of a simulation of the process data in the plant based on the simulation model 7 by the process simulator 6, and the calculated estimated values, together with the time data. This simulation is performed by the process simulator 6 based on the simulation model 7. This server includes a computer, a workstation and the like.

Further, the simulation data server 11 transmits the stored estimated values to the plant diagnoser 12, and upon receiving a diagnosis result of the plant diagnoser 12, it transmits the received data to the process simulator 6. The simulation data server 11 may exist in the local network or in the system for realizing cloud computing via the Internet.

The initial value generator 9 sets a process simulation result at a predetermined time as an initial value. Here, the initial value refers to an initial value such as a parameter and a set condition of the simulation model 7.

The estimated value extractor 8 extracts parameters described below from among the actual measured values of the process data, the actual plant data and/or the estimated values of the plant data, based on the type of these data. The actual measured value of the process data includes measurement data obtained from the actual plant 15, such as flow rate, pressure, temperature and the like in the actual plant 15 detected by field devices (not shown). The process data estimated value is calculated by simulation using the process simulator 6. The parameter extracted by the estimated value extractor 8 is required when the KPI deriver 1 derives the KPI.

The process data measured by the field devices arranged in the actual plant 15 is transmitted to the parameter modifier 4 via a wired or wireless network, a controller, a relay device and the like, and via the process data server 2 and the input interface 3 that are included in the plant operation support apparatus of the present disclosure.

That is, from the actual plant 15, the measurement data measured by the field devices is transmitted to the process data server 2 via the controller, the network and the like. Here, the field devices include a transmitter and a flow meter as examples. Hereinafter, these exemplified devices will be referred to as field devices for convenience.

The process simulator 6 performs calculation in parallel with an operation of the actual plant 15 using the simulation model 7 including physical and chemical model equations. The process simulator 6 outputs the calculation result (estimated value) to the display 14 and displays the estimated value. The output of the process simulator 6 is hereinafter referred to as a simulated output (or an estimated value). The parameter determiner 5 selects a parameter to be modified from a correlation between the process data and variables of the simulation model 7.

Further, the parameter determiner 5 selects a parameter highly correlated with a simulation result based on a result of analysis of data at the time of plant start-up and a model formula. Here, the analysis described above is performed on a degree of influence on the simulation result by a change in the parameter included in the simulation model 7.

The process data obtained from the actual plant 15 is converted by the input interface 3. Among data generated by the conversion, the parameter selected by the parameter determiner 5 is modified by the parameter modifier 4 based on an input from the parameter determiner 5. The parameter modifier 4 modifies the parameter so that the simulated output (or estimated value) from the process simulator 6 approximates an actual output which is the process data of the actual plant 15. The modified parameter is transmitted from the parameter modifier 4 to the process simulator 6.

The process simulator 6 performs a process simulation calculation of simulating the operation of the actual plant 15 using the simulation model including the physical and chemical model equations based on the parameter modified by the parameter modifier 4. This simulation result is stored in the simulation data server 11.

Based on the stored data, the process simulator 6 displays on the display physical quantities, process values, and characteristic values of a device and products in a place (including equipment or a pipe) which cannot actually be measured in the plant operation based on the stored data. Further, the process simulator 6 displays on the display the process data, characteristic values of the device and products which are not detected in the actual plant 15, among the calculation results (estimated values) in the simulation described above.

The process simulator 6 performs simulation in parallel with the operation of the actual plant 15 in real time by using the simulation model 7 based on the modified parameters. Here, when the process simulator 6 performs simulation in parallel with the operation of the real plant 15, the process simulator 6 modifies the parameters so that the output of the simulation model approximates an output of the actual plant 15.

The estimated value extractor 8 extracts the estimated value at a current time or a predetermined time from the estimated value obtained by the simulation performed by the process simulator 6 based on the process data obtained from the actual plant 15 and the parameters obtained in the parameter modifier 4. The estimated value extractor 8 transmits the extracted data (extracted value) and the parameters to the KPI deriver 1 described below.

When a process behavior of a predetermined time ahead (for example, a few minutes or a few hours ahead) is predicted by operating the process simulator operating concurrently with the actual plant at a speed higher than an operation speed of the actual plant, the future predictor 10 receives the process simulation result at a certain time as the initial value via the initial value generator 9.

The future predictor 10 performs the calculation relating to the simulation for predicting a state at a predetermined future time of the plant based on the received initial value. At this time, a lapse speed of a time parameter used in the simulation model is increased to a high speed, for example, several times to several hundred times of a normal speed at which the actual plant operates (or a speed at which the normal time elapses). Further, the future predictor 10 transmits the simulation result (predicted data) at the predetermined time calculated by the future predictor 10 to the controller 13 and the KPI deriver 1. The parameters (state variables) of the simulation model are modified based on the actual data from the actual plant.

The KPI deriver 1 derives a current KPI (hereinafter referred to as an estimated KPI) from among the estimated values calculated by the process simulator 6 based on the process data of the actual plant 15 by using the extracted value (estimated value data) necessary to derive KPI among the extracted values extracted by the extractor 8.

When the KPI deriver 1 derives the estimated KPI, the KPI deriver 1 may derive the estimated KPI not only by using the estimated value data but also based on, for example, the data necessary to derive KPI among the process data and the actual measured values of the actual plant 15 stored in the process server 2.

Further, when the KPI deriver 1 derives the estimated KPI, the KPI deriver 1 may use the estimated value data and the process data or the actual data of the actual plant 15. For example, the estimated KPI may be derived based on the process data or the actual measured value data of the actual plant 15 stored in the process data server 2 and each data necessary to derive the KPI among the estimated values which are calculated by the process simulator 6 and extracted by the estimated value extractor 8.

Furthermore, the KPI deriver 1 derives a KPI (hereinafter referred to as a predicted KPI) at a time of proceeding to the future by a presettable predetermined time from the current time or any time by using the process data of the actual plant 15, the estimated value calculated by the process simulator 6, and the predicted data calculated by the future predictor 10.

The KPI deriver 1 selects the parameter necessary to derive the KPI and sets a threshold value for the KPI. The operator can set the threshold value in advance. Here, the KPI values derived in the present disclosure include as examples a value and an index of safety of the plant operation, product quality, production amount, production efficiency, and environmental load. In addition, the process data, the estimated data (estimated value), the predicted data (predicted value), or a parameter of the simulation model 7 in the plant may be set as the KPI, according to a type of the task to be monitored by the operator. An instruction to display the KPI derived by the KPI deriver 1 on the display 14 is transmitted to the controller 13.

The plant diagnoser 12 diagnoses a state of each piece of equipment or each process related to the operation state of the plant or the task to be monitored by the operator. The diagnosis is performed by the plant diagnoser 12 by comparing past parameters such as parameters at the initial stage of plant operation initiation and parameters modified by simulation received from the simulation data server 11 with parameters modified in the current simulation.

Further, the plant diagnoser 12 compares a change in the parameter used in the simulation model for the past process simulation with a change in the parameter in the current process simulation. When a difference between the two exceeds a preset tolerance, for example, as a plant abnormality indicating a failure of the field device or a pipe failure in the plant, abnormality information indicating that fact is transmitted to the controller 13.

The controller 13 displays to a plant operator that the plant is abnormal via screen display on the display 14. That is, when the change in the parameter in the current process simulation is greatly different from a change in the parameter stored as the past data, the plant diagnoser 12 transmits the plant abnormality to the controller 13.

The plant diagnoser 12 estimates which portion in the plant is abnormal based on the model equations of the simulation model 7 and/or the change in the parameter of the model. Further, the plant diagnoser 12 checks consistency between the estimated value calculated by the process simulator 6 and the actual data obtained from the actual plant 15. When the difference between the two exceeds a preset tolerance, the plant abnormality is displayed on the display 14.

The controller 13 instructs an operation amount command value to a control target (for example, an actuator, a controller or the like) installed in the actual plant 15. In addition, the controller 13 obtains the data of the actual plant 15 via the process data server 2, and transmits the obtained data to the process simulator 6. In addition to this, the controller 13 outputs and displays the estimated KPI and the predicted KPI derived by the KPI deriver 1 on the display 14.

In the above description, there are described the plant operation support apparatus having the process data server 2, the input interface 3, the parameter modifier 4, the parameter determiner 5, the process simulator 6, the process simulation model 7, the simulation data server 11, the plant diagnoser 12, the controller 13, the initial value generator 9, the future predictor 10, the KPI deriver 1, the estimated value extractor 8, and the display 14. However, the plant operation support apparatus of the present disclosure is not limited to the plant operation support apparatus described above. A function of any one of these units may operate on a different terminal device and cooperate with functions of the other units via a network (not shown) so that a function of the plant operation support apparatus according to the present disclosure can be provided.

<Configuration Example of KPI Deriver>

Figure 2:
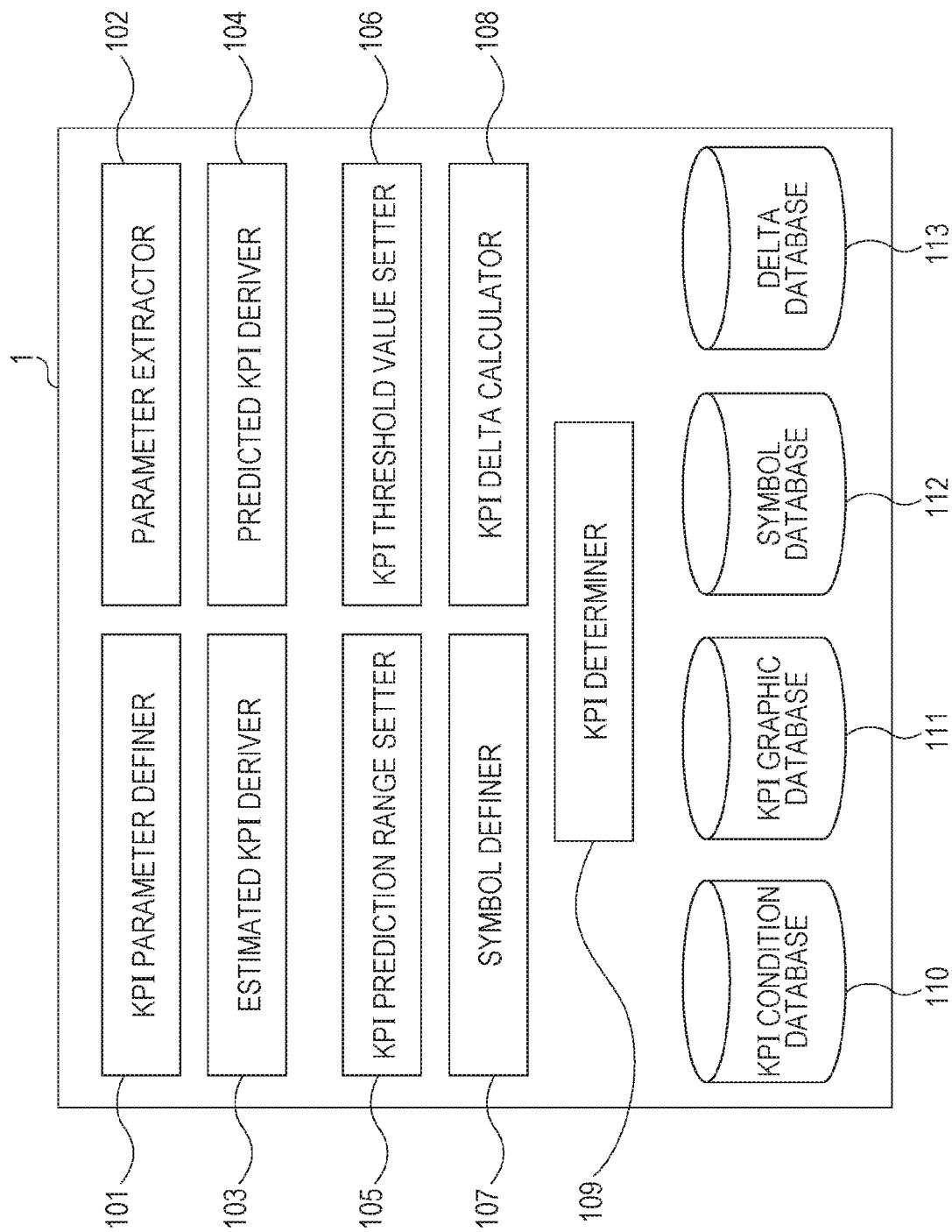
FIG. 2 is a configuration explanatory diagram of a KPI deriver of the above-described plant operation support apparatus.

Next, the KPI deriver 1 which is a component of the plant operation support apparatus of FIG. 1 will be described in detail with reference to FIG. 2. FIG. 2 is a configuration explanatory diagram of the KPI deriver in the embodiment of the plant operation support apparatus of the present disclosure. The KPI deriver 1 of the present disclosure includes a KPI parameter definer 101, a parameter extractor 102, an estimated KPI deriver 103, a predicted KPI deriver 104, a KPI prediction range setter 105, a KPI threshold value setter 106, a symbol definer 107, the KPI delta calculator 108, a KPI determiner 109, a KPI condition database 110, a KPI graphic database 111, a symbol database 112, and a delta database 113. The KPI deriver 1 may have a database for storing the derived estimated KPI and predicted KPI. Further, the database may be a memory or an external storage medium.

The estimated KPI deriver 103 derives the estimated KPI based on predetermined data or parameter necessary to derive each KPI defined by the KPI parameter definer 101 among the process data or the actual measured value data obtained from the actual plant 15 and stored in the process data server 2 and/or the extracted value extracted by the estimated value extractor 8. The estimated KPI deriver 103 may derive the estimated KPI by using the physical model equation, the chemical model equation, or empirical equation as needed.

When the derived estimated KPI is a KPI (hereinafter referred to as an estimated KPI value) which can be represented by a numerical value, the estimated KPI value is transmitted to the KPI delta calculator 108. The transmitted estimated KPI value is displayed after being subjected to a condition determination process related to, for example, a plurality of process values such as safety and quality. The estimated KPI which cannot be represented by a numerical value is transmitted to the KPI determiner 109.

With the plant operation support apparatus of the present disclosure, it is possible to derive KPI for each task. Here, the task refers to a classification of manufacturing process depending on operation purpose of the operator. An example of the task is a task relating to a reactor load change and a new pump start in the plant for producing chemical products. The KPI of reactor load change is safety of the reactor, the quality of the chemical products produced in the plant, the production amount of the chemical products, and the production amount right after the reactor. This KPI is subjected to the condition determination process by the estimated KPI deriver 103 and transmitted to the KPI determiner 109.

The KPI prediction range setter 105 sets until when in the future the KPI is derived and in which timing the KPI is synchronized. For example, in what minute intervals the KPI is derived is set.

The predictive KPI deriver 104 derives the predicted KPI by processing the future process data received from the future predictor 10 based on the data or parameters predetermined for deriving each KPI defined by the KPI parameter definer 101 within the period from the present time or a certain time to a predetermined future set in advance by the KPI prediction range setter 105. Further, in the predicted KPI deriver 104, the predicted KPI may also be derived by using the physical model equation or the chemical model equation as necessary, similarly to the estimated KPI.

When the derived predicted KPI is also a KPI (hereinafter referred to as a predicted KPI value) which can be represented by a numerical value similarly to the estimated KPI, the predicted KPI value is transmitted to the KPI delta calculator 108. The predicted KPI which cannot be represented by a specific numerical value is transmitted to the KPI determiner 109.

The KPI delta calculator 108 calculates a delta between the estimated KPI value received from the estimated KPI deriver 103 and the predicted KPI value received from the predicted KPI deriver 104. This delta of KPI is stored in the delta database 113 as a delta of KPI at a future predetermined time or timing. The stored delta of KPI is transmitted to the KPI determiner 109.

The KPI threshold value setter 106 sets a value to determine the plant abnormality when the predicted KPI value or the delta of KPI is equal to or greater than, or equal to or less than the value. For example, when the KPI represents the production efficiency, the threshold value is set to 10% in order to determine the plant abnormality when the production efficiency is 10% or less.

The symbol definer 107 predefines symbols to be displayed corresponding to one or a plurality of threshold values set by the KPI threshold value setter 106. One or a plurality of threshold values and one or more symbols defined by the symbol definer 107 are stored in the symbol database 112. Here, the symbol is a display (icon) which can be intuitively understood whether the KPI is normal when visually recognized by the operator. For example, the symbol may be a picture of a smiling face or a picture of an angry face.

Further, a threshold value of a delta between the predicted KPI value and the estimated KPI value or an absolute value thereof (hereinafter referred to as a delta of KPI) set by the KPI threshold value setter 106 is stored in the KPI condition database 110 together with their corresponding symbols as one or a plurality of threshold values used when the state of the plant is compared and determined. Furthermore, the threshold value of the predicted KPI value set by the KPI threshold value setter 106 is also stored in the KPI condition database 110 together with their corresponding symbols as one or a plurality of abnormal state conditions used when the state of the plant is compared and determined.

The KPI determiner 109 may determine whether the predicted KPI value or the delta of KPI calculated by the KPI delta calculator exceeds the threshold value based on the threshold values of the predicted KPI value and the delta of KPI stored in the KPI condition database 110.

As an example of the threshold in the present disclosure, there is High-High (hereinafter referred to as HH) which is the maximum value of the threshold value and a value indicating the abnormal state of the plant, Pre-High (hereinafter referred to as PH) and Pre-Low (hereinafter referred to as PL) which are thresholds indicating that attention is required for transition of the parameter although they are not the abnormal state of the plant, and Low-Low (hereinafter referred to as LL) which is the minimum value of the threshold value and a value indicating the abnormal state of the plant. A range of a normal state may be defined using these threshold values.

Above-described "PH" described as an example of the threshold value in the present disclosure is the next largest value after "HH". "PL" is the next largest value after "PH". "HH" is the maximum value among respective threshold values. "LL" is the minimum value among the respective threshold values.

Hereinafter, in description of an example of the embodiment of the present disclosure, "within a range indicating the normal state" means "within a range between values of PH and PL".

A symbol definition for the threshold value stored in the KPI condition database 110 is referred based on a determination result by the KPI determiner 109 based on the predicted KPI or the delta of KPI. Then, a symbol mark corresponding to the determination result based on the predicted KPI or the delta of the KPIs at a predetermined time is displayed on the display 14.

Information on the delta of KPI is transmitted to the controller 13. An instruction command to display the transmitted delta as a graph on the display 14 is transmitted from the controller 13. Then, the graph is generated and displayed on the display 14. The KPI determiner 109 may be able to instruct, for example, colors and lengths of the bar graph depending on a degree of the threshold value for a magnitude of the delta of KPI. For example, the KPI determiner 109 of the present disclosure may determine a severity level of the abnormal state to be determined depending on the magnitude of the delta of KPI.

Figure 7:
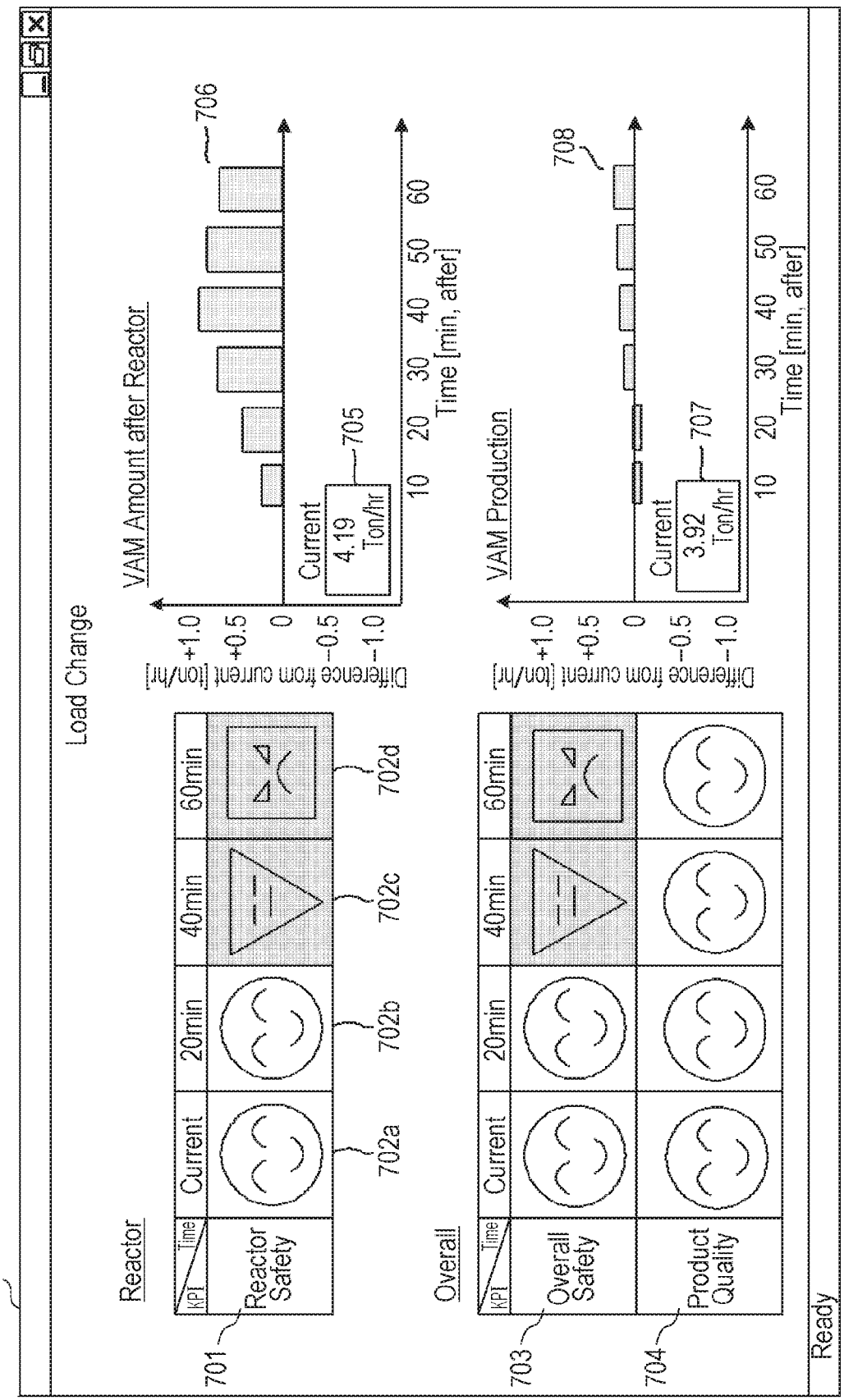
FIG. 7 is an example of a screen displaying KPIs in the embodiment of the plant operation support apparatus of the present disclosure.

The KPI graphic database 111 stores graphic data of the KPI output screen for each task and their graphic parts. As an example of this graphic data, there is graphic data for displaying the KPIs of the safety of the reactor in the "reactor load change", the quality of the chemical products produced in the plant, the production amount of chemical products, and the production amount right after the reactor by the symbol marks and in the bar graph format as shown in FIG. 7.

The parameter extractor 102 obtains the following actual data, estimated value, and process data from the process data server 2, the process simulator 6, and the future predictor 10. This actual data includes the actual measured value and the process data obtained from the actual plant 15. The estimated value is calculated by the process simulator 6. The above-described process data includes the process data (predicted value) calculated by the future predictor 10 at a moment or a time advanced to the future by a predetermined time from the present. These actual data, the estimated value, and the process data are required to create a conditional expression 408 (in FIG. 4) described below. Further, the parameter extractor 102 may be able to extract parameters required to create the conditional expression 408 (described later).

The delta database 113 stores the predicted KPI or the delta between the predicted KPI and the estimated KPI, and the absolute value of the delta. The delta database 113 may store these one or a plurality of predicted KPIs and one or a plurality of deltas of the KPI together with time-series data based on one or a plurality of predetermined future times calculated by the future predictor 10.

The above-described KPI deriver 1 of the present disclosure includes the KPI parameter definer 101, the parameter extractor 102, the estimated KPI deriver 103, the predicted KPI deriver 104, the KPI prediction range setter 105, the KPI threshold value setter 106, the symbol definer 107, the KPI delta calculator 108, the KPI determiner 109, the KPI condition database 110, the KPI graphic database 111, the symbol database 112, and the delta database 113. However, the KPI deriver 1 is not limited to the above-described KPI deriver 1. A function of any one of these units may operate on a different terminal device and cooperate with functions of the other units via a network (not shown) so that the plant operation support apparatus according to the present disclosure can be operated.

<Description of Operation of the Present Disclosure: Flow of Derivation of KPI>

The operator can derive the KPI corresponding to the task to be monitored by using the plant operation support apparatus of the present disclosure. A method of deriving the operation, the estimated KPI value, and the predicted KPI value of the present disclosure will be specifically described with reference to FIGS. 3 and 4.

Figure 3:
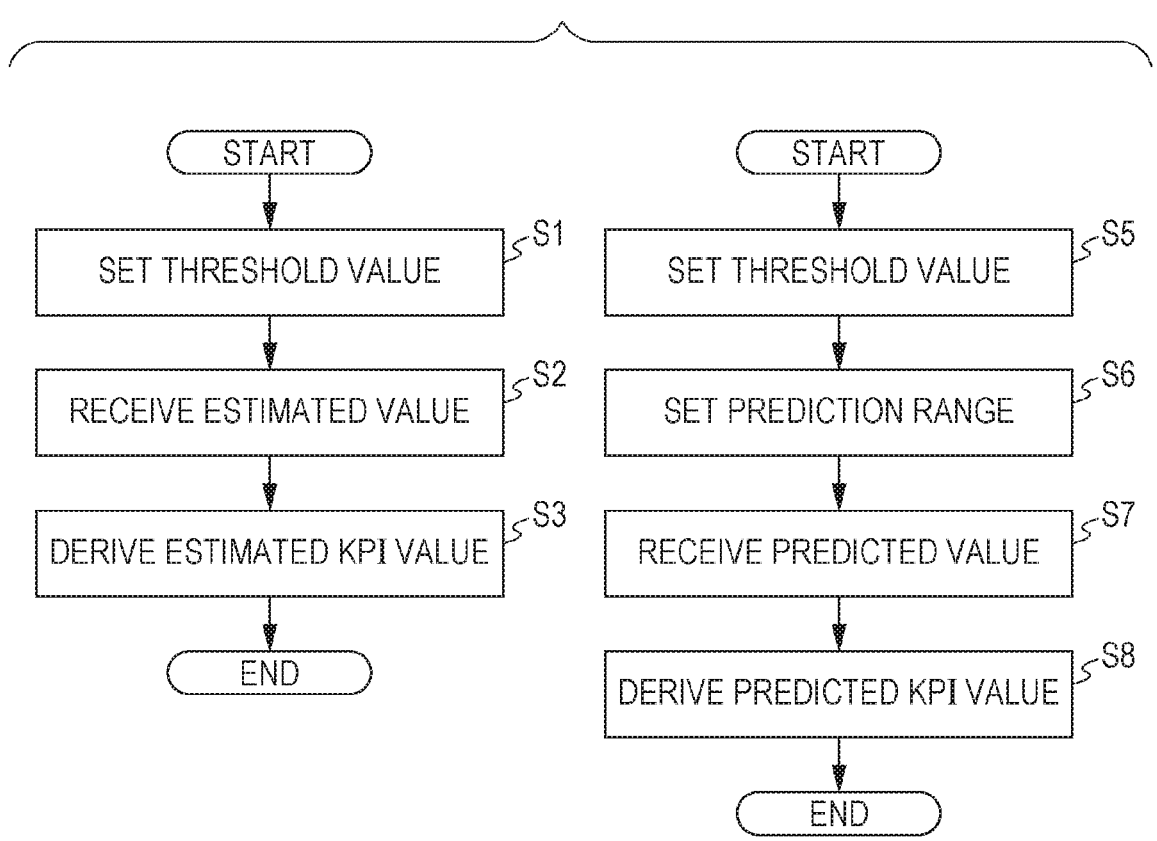
FIG. 3 is a flowchart of a process of deriving an estimated KPI value and a predicted KPI value in an embodiment of the plant operation support apparatus of the present disclosure.
Figure 4:
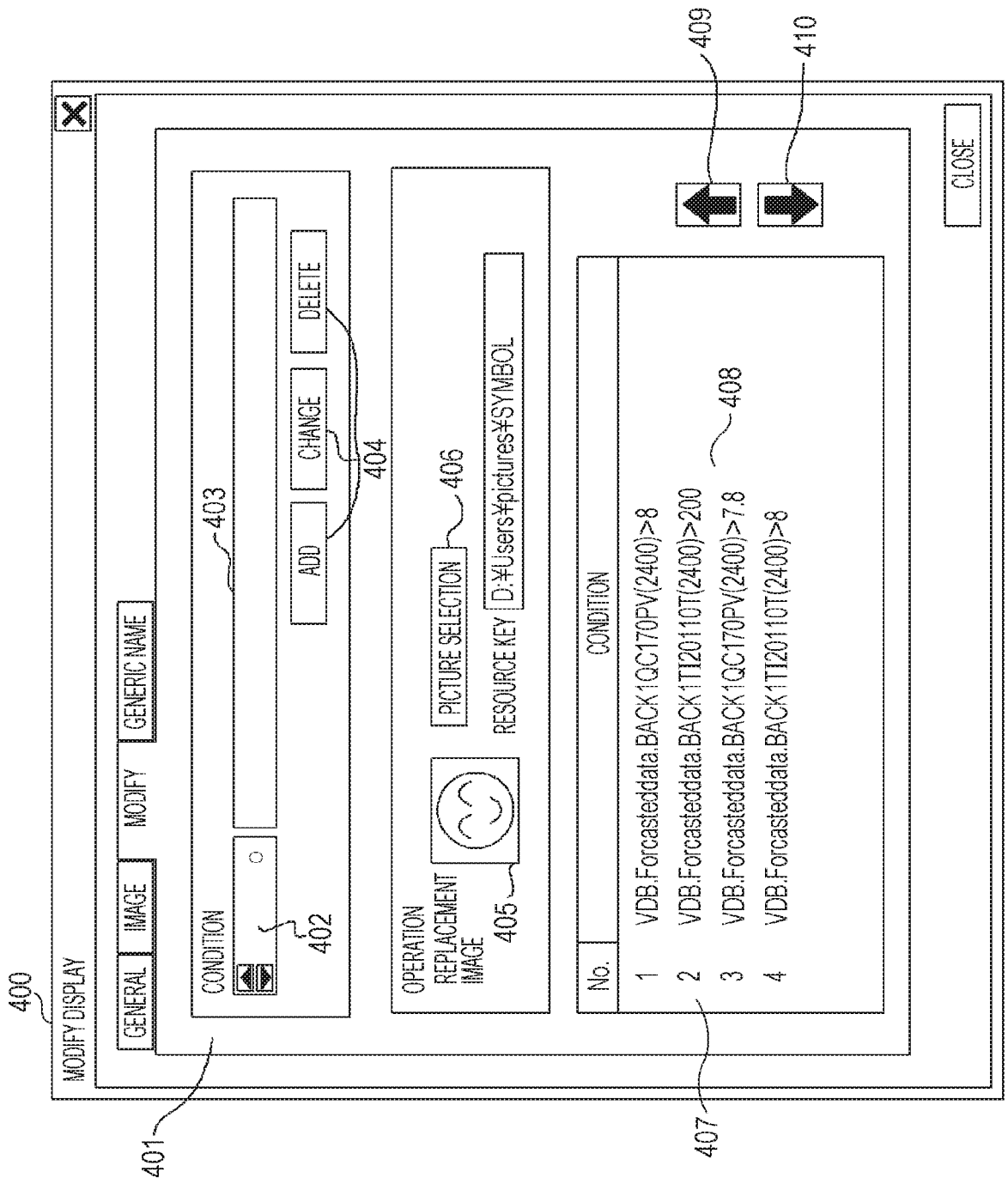
FIG. 4 is an example of a setting screen for setting a KPI threshold value and a symbol in the embodiment of the plant operation support apparatus of the present disclosure.

FIG. 3 is a flowchart showing a process of deriving the estimated KPI value and the predicted KPI value performed by the embodiment of the plant operation support apparatus of the present disclosure. FIG. 4 is an example of a setting screen for setting the KPI threshold value and the symbol displayed in the embodiment of the plant operation support apparatus of the present disclosure. In the present disclosure, a method of calculating the estimated value and the predicted value by the plant simulator is the same as a technique described in Japanese Patent No. 4789277, which is a conventional technique. Therefore, description of this method will be omitted.

(Derivation of Estimated KPI Value)

First, in step S1, the operator activates a setting screen 400 for setting the threshold value and the symbol of the KPI as shown in FIG. 4 and sets a conditional expression necessary to derive the estimated KPI value, and/or inputs the threshold value of the parameter or the process data necessary to derive the estimated KPI value (step S1). As shown in FIG. 4, the display 14 displays on the setting screen 401 a conditional expression number input area 402, a conditional expression input area 403, an operation button 404, a symbol image 405 to be displayed, a symbol selection button 406, a conditional expression number 407, a conditional expression 408, and conditional expression selection buttons 409 and 410.

In order to set the conditional expression, the operator inputs one of the conditional expression numbers 407 to the conditional expression number input area 402, and inputs the conditional expression 408 corresponding to the input conditional expression number 407 to the conditional expression input area 403. For example, as shown in FIG. 4, when "1" is input as the conditional expression number 407, the corresponding conditional expression "VDB.Forcasteddata.BACK1QC1170PV(2400)>8" is input as the conditional expression. After entering the conditional expression, the operator can further input the conditional expression number 407 and the conditional expression 408 by pressing "ADD" by the operation button 404. The conditional expression 408 is created with reference to, for example, the estimated value to be extracted from the parameter extractor 102 and/or the process data which is obtained from the actual plant 15 and stored in the process data server 2. Further, in order to define the symbol, the operator presses a picture selection button 406 (symbol selection button) to select the symbol to be displayed, thereby updating the symbol image 405 to be displayed.

Next, in step S2, the estimated KPI deriver 103 receives the process data and the actual measured data and/or the estimated value calculated by the process simulator 6, which are the current values obtained from the actual plant and stored in the process data server 2 (step S2). At this time, the estimated KPI deriver 103 selects and obtains from the parameters (the estimated values extracted by the estimated value extractor 8 and/or the actual measured value data and the process data received from the actual plant and stored in the process data server 2) necessary to derive the KPI set in advance in step S1 based on these characteristics.

Further, in step S3, the estimated KPI deriver 103 derives the estimated KPI value from the obtained estimated value (step S3). As a method of deriving the estimated KPI value, a different derivation method may be performed depending on the type of KPI. For example, the type of the tasks to be monitored by the operator is different between a case where a value derived using a calculation formula such as production efficiency is defined as the estimated KPI value and a case where an estimated value such as production amount is defined as the estimated KPI value. Therefore, depending on this delta, the method of deriving these estimated KPI values may be different from each other. In this way, it is possible to define an optimum estimated KPI value for the task to be monitored depending on a plant equipment and environment. Therefore, the optimum estimated KPI value can be derived from a plurality of parameters and displayed on a display screen. As a result, a state in the plant can be understood depending on facility environment.

(Derivation of Predicted KPI Value)

First, similarly to the derivation of the estimated KPI value, in step S5, the operator activates a setting screen for setting the threshold value and the symbol of the KPI as shown in FIG. 4, sets conditional expression necessary to derive the predicted KPI value, and inputs the parameters or the process data necessary to derive the predicted KPI value (step S5).

The method of setting the conditional expression is the same as the method described above. In addition to the method, the conditional expression 408 may be created with reference to, for example, the process data obtained from the actual plant 15 and extracted from the parameter extractor 102, and the process data obtained from the future predictor 10 at a moment (or a time) advanced to the future by a predetermined time from the current.

Next, in step S6, the KPI prediction range setter 105 sets until when in the future the predicted KPI value is derived, and in which timing, for example, in what minute intervals or at a predetermined cycle the predicted KPI value is derived (step S6).

Further, in step S7, the process data which is the current value obtained from the actual plant, the estimated value calculated by the process simulator 6, and the predicted value obtained in the plant in future calculated by the future predictor 10 are received (step S7). At this time, the predicted KPI deriver 104 receives the parameter necessary to derive the predicted KPI value set in advance in step S5.

In step S8, the predicted KPI deriver 104 derives the predicted KPI value from the obtained current value, estimated value, and predicted value (step S8). Further, in step S8, the predicted KPI deriver 104 repeats derivation of the predicted KPI value up to a predetermined time at a predetermined prediction interval or a cycle set in step S6.

As a method of deriving the predicted KPI value, a different derivation method may be performed depending on the task to be monitored by the operator. For example, the type of the tasks to be monitored by the operator is different between a case where a value derived using a calculation formula to calculate production efficiency is defined as the predicted KPI value and a case where a predicted value such as production amount is defined as the predicted KPI value. Therefore, depending on this delta, the method of deriving these predicted KPI values may be different from each other. In this way, it is possible to define an optimum predicted KPI value for the task to be monitored depending on a plant equipment and environment. Therefore, the optimum predicted KPI value can be derived from a plurality of parameters and displayed on a display screen. As a result, a state in the plant can be understood depending on facility environment.

<Method of Displaying KPI on Display (1) Symbol Display>

Figure 5:
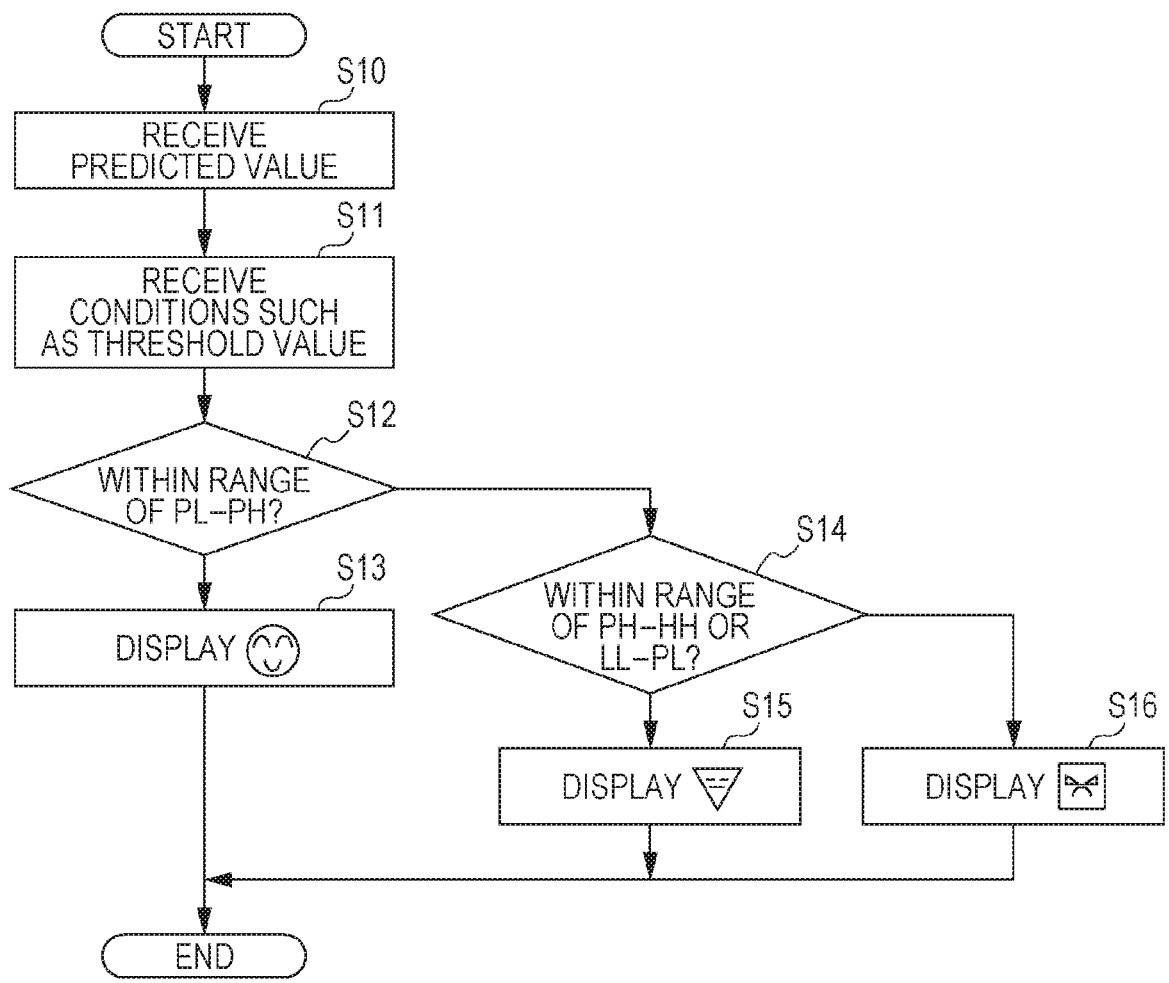
FIG. 5 is a flowchart for displaying symbol marks of the derived estimated KPI and the predicted KPI in the embodiment of the plant operation support apparatus of the present disclosure.

Further, a flowchart for displaying the derived estimated KPI value and predicted KPI value on the display screen and displaying the symbol mark corresponding to the KPI value is shown in FIG. 5.

First, in step S10 of FIG. 5, the estimated KPI deriver 103 and the predicted KPI deriver 104 transmit the estimated KPI value and the predicted KPI value derived from the KPI value deriving method described above (Steps S1 to S3 and Steps S5 to S8) to the KPI determiner 109 (step S10). In step S11, the KPI determiner 109 compares a preset threshold value related to the KPI value with the derived predicted KPI value (step S11).

Next, in step S12, the KPI determiner 109 determines whether the derived predicted KPI value is within a range between PL and PH (step S12). When it is determined that the derived predicted KPI value is within the range from PL to PH, a symbol is displayed on the display 14 at the predetermined time interval based on defined information in step S13 (step S13). Here, in step S13, the KPI determiner 109 displays the symbol to be output (an example in FIG. 5 is a symbol of a smiling face) on the display 14 with reference to the corresponding symbol from the KPI condition database 110.

When it is determined that the predicted KPI value derived in step S12 is not a value within the range from PL to PH, the KPI determiner 109 determines in step S14 whether the derived predicted KPI value is a value within a range from PH to HH, or a value within a range from LL to PL (step S14).

When it is determined that the predicted KPI value derived in step S14 is a value within the range from PH to HH or a value within the range from LL to PL, a symbol is displayed on the display 14 at the predetermined time interval based on the defined information in Step 15 (step S15). Here, in step S15, the KPI determiner 109 displays the symbol to be output (an example in FIG. 5 is a symbol of an expressionless face) on the display 14 with reference to the corresponding symbol from the KPI condition database 110.

When it is determined in step S15 that the derived predicted KPI value is neither a value within the range from PH to HH nor a value within the range from LL to PL, that is, when the predicted KPI value is not less than HH or not more than LL, a symbol is displayed on the display 14 at the predetermined time interval based on the defined information in step S16. Here, in step S15, the KPI determiner 109 displays the symbol to be output (an example in FIG. 5 is a symbol of an angry face) on the display 14 with reference to the corresponding symbol from the KPI condition database 110.

The KPI determiner 109 repeats the operations shown in Steps S12 to S16 described above up to a predetermined time period based on a predetermined time interval (Steps S12, S13, S14, S15 and S16).

Here, an example of the screen displaying the KPI will be described with reference to FIG. 7. FIG. 7 is an example of the screen displaying the KPI in the embodiment of the plant operation support apparatus of the present disclosure. In FIG. 7, as an example, the display 14 displays KPIs up to the future 60 minutes ahead of the current time or a predetermined time at 20-minute intervals. As an example, KPI showing safety and quality in a task of the "reactor load change" in the plant is displayed.

In FIG. 7, 701 indicates KPIs of the current, after 20 minutes, after 40 minutes, and after 60 minutes related to the safety of the reactor based on predetermined symbols. 702a to 702d indicate the symbols corresponding to the determination result by the KPI determiner 109 based on the estimated KPI value or predicted KPI value of the current, after 20 minutes, after 40 minutes, and after 60 minutes.

703 indicates the KPI of safety of the entire task of "reactor load change", and 704 indicates the KPI related to the product quality. The symbols displayed in 703 and 704 are also displayed according to the determination result of the KPI determiner 109 as described above.

As an example, the KPI of the safety in the task of "reactor load change" in the plant may be derived based on at least one or a combination of two or more among temperatures at each stage of the reactor, oxygen concentration at an inlet of the reactor, ethylene concentration at the inlet of the reactor, and flow rate and temperature of cooling water for cooling the reactor.

For example, according to the KPI of the safety in the task of "reactor load change", a state in which at least one among a temperature at a certain point of each divided region obtained by dividing a reactor interior into ten parts, the oxygen concentration at the inlet of the reactor, the ethylene concentration at the inlet of the reactor, and the flow rate and temperature of the cooling water for cooling the reactor exceeds the predetermined threshold value means abnormality. In that case, in FIG. 7, the symbol of the angry face such as 702d is displayed.

This KPI may be calculated by a predetermined calculation formula using at least one of one or more parameters, process data, and estimated data (or predicted data) by the estimated KPI deriver 103 (or the predicted KPI deriver 104).

Further, the KPI related to the quality of the product in the task of "reactor load change" in the plant may be derived based on, as an example, a concentration of acetic acid in the product and a concentration of water in the product. For example, in FIG. 7, the KPI related to the quality of the product in the task of "reactor load change" is indicated by the symbol of the smiling face like 704 when both values of the concentration of acetic acid in the product and the concentration of water in the product are within the range of the predetermined threshold values. Note that the symbol display is not limited to the symbol of the face. Any symbol can be used as long as the operator can understand it at a glance.

<Method of Displaying KPI on Display (2) Graph Display>

Figure 6:
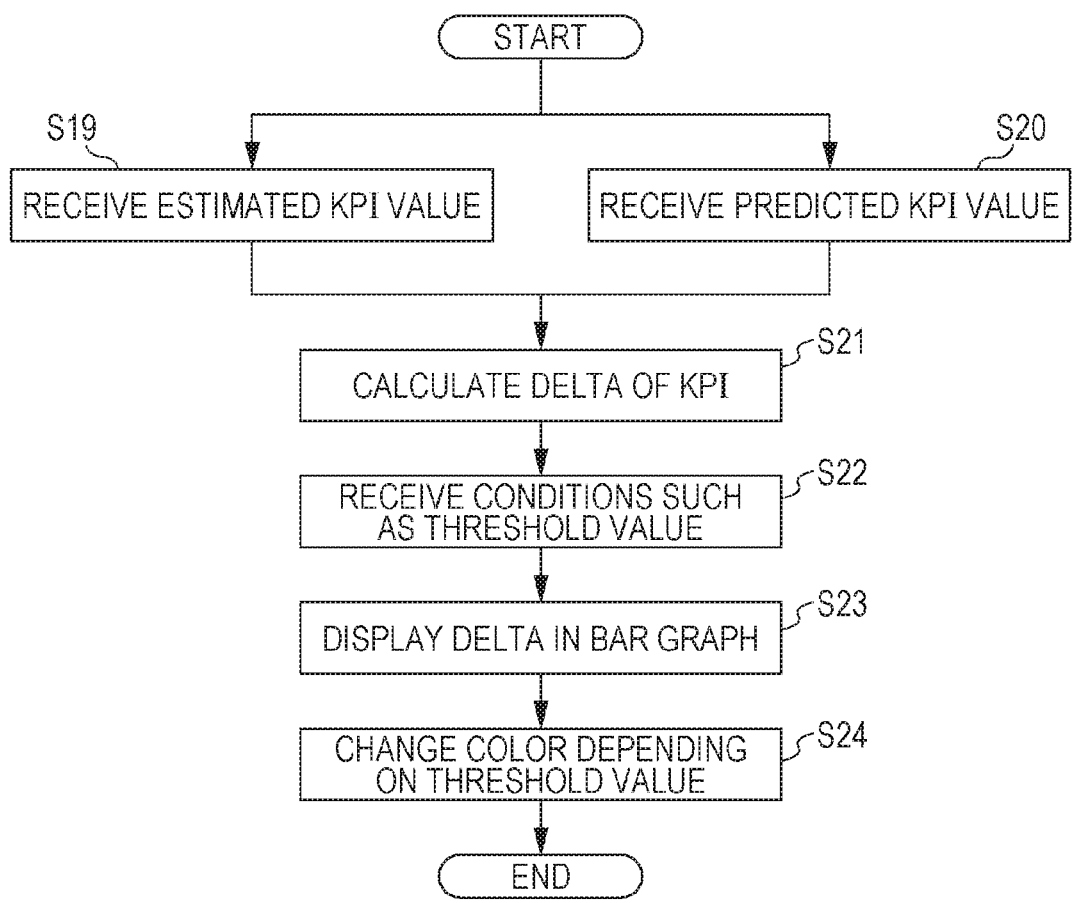
FIG. 6 is a flowchart for displaying a delta between the derived estimated KPI value and the predicted KPI value in a bar graph format in the embodiment of the plant operation support apparatus of the present disclosure.

Next, FIG. 6 shows a flowchart for displaying on the display screen the derived estimated KPI and the predicted KPI, especially the delta of KPI as a graph, here as a bar graph as an example.

First, in steps S19 and S20, the estimated KPI deriver 103 and the predicted KPI deriver 104 transmit the estimated KPI value and the predicted KPI value derived by the above-described method (Steps S1 to S3, Steps S5 to S8) of deriving the estimated KPI value and the predicted KPI value to the KPI delta calculator 108 (step S19, step S20).

In step S21, the KPI delta calculator 108 calculates a delta between the estimated KPI value and the predicted KPI value (step S21), and transmits the calculated delta to the KPI determiner 109.

In step S22, the KPI determiner 109 obtains threshold values for each KPI preset for each task (step S22).

In step S23, the bar graph is displayed at a predetermined time interval based on information defined in the KPI condition database 110 (step S23).

A predefined color corresponding to the threshold value may be stored in the KPI condition database 110 so that when (the absolute value of) the delta between the estimated KPI value and the predicted KPI value is out of the range of the threshold values indicating the normal state defined by the threshold values stored in the KPI condition database 110, that is, when it is determined that the state is an abnormal state, the color of the bar graph can be changed according to a magnitude of a difference between the threshold value (one of HH, PH, PL, and LL) closest to the absolute value of the delta and the absolute value of the delta (step S24).

In the other embodiments of the present disclosure, the display in step S23 is not limited to the creation of the bar graph using (the absolute value of) the delta between the estimated KPI value and the predicted KPI value as described above. For example, when the predicted KPI value is out of the range of the threshold values indicating the normal state defined by the threshold values stored in the KPI condition database, that is, when it is determined that the state is an abnormal state, a predefined color corresponding to the threshold value may be stored in the KPI condition database 110 so that the color of the bar graph can be changed depending on a magnitude of a difference between the threshold value (one of LL, PH, PL, LL) closest to the predicted KPI value and the predicted KPI value.

In FIG. 7, an example of a display screen displaying KPI will be described. In the display screen in FIG. 7, 705 represents the amount of chemical products produced at present at an exit of the reactor. In addition, 706 represents the delta between the estimated KPI value and the predicted KPI value for the production amount of the chemical products. In the same way, 707 represents the production amount of the chemical products produced at present. Further, 708 represents the delta between the estimated KPI value and the predicted KPI value for the production amount of the chemical products.

Further, 706 and 708 indicate in a bar graph form the delta between the estimated KPI and the predicted KPI of the current, after 10 minutes, after 20 minutes, after 30 minutes, after 40 minutes, after 50 minutes, and after 60 minutes. Note that the display format is not limited to the bar graph. It may be displayed in any graph.

As described above, the plant operation support apparatus according to the present embodiment includes the KPI parameter definer 101, the estimated KPI deriver 103, and the predicted KPI deriver 104. The KPI parameter definer 101 defines types of parameters necessary to derive each KPI. The estimated KPI deriver 103 derives the estimated KPI value by selecting one or a plurality of data or parameters necessary to derive each KPI defined by the KPI parameter definer 101 based on their types from among the process data or the actual measured value data and/or the estimated value data or each parameter extracted by the estimated value extractor 8, which are obtained from the actual plant and stored in the process data server 2. The predicted KPI deriver 104 derives the predicted KPI by selecting one or a plurality of data or parameters necessary to derive each predicted KPI defined by the KPI parameter definer 101 based on the types of the data or parameters from among the process data in future received from the future predictor 10 within a period set in advance by the KPI prediction range setter 105.

With such a configuration, the plant operation support apparatus of the present disclosure can derive KPIs necessary for operation and monitoring for each task and display the derived KPIs on the display screen. Therefore, the operator does not have to monitor a plurality of process data. As a result, the operator can intuitively understand the state in the plant.

The plant operation support apparatus according to the present embodiment further includes the KPI delta calculator 108 and the KPI determiner 109. The KPI delta calculator 108 receives the estimated KPI from the estimated KPI deriver 103 and receives the predicted KPI from the predicted KPI deriver 104, and calculates the delta between the estimated KPI and the predicted KPI. The KPI determiner 109 determines whether the predicted KPI or the absolute value of the delta of KPI calculated by the KPI delta calculator 108 exceeds the threshold value (PH or PL) requiring attention to the transition of the parameter based on a threshold value for the predicted KPI or the absolute value of the delta between the predicted KPI and the estimated KPI.

With such a configuration, the plant operation support apparatus of the present disclosure can collectively confirm at least two or more KPIs or parameters which need to be monitored during performing a specific task. Therefore, it is possible to reduce the monitoring burden on the operator.

Hereinabove, the embodiments of the present disclosure have been described in detail with reference to the drawings. However, specific configurations are not limited to the above-described embodiments. The scope of the present embodiment also includes designs and the like within the scope not departing from the spirit and scope thereof. For example, respective functions described in the above embodiments can be arbitrarily combined.

Especially, the embodiments of the present disclosure includes a plant operation support method including operation of the plant operation support apparatus, and a computer-readable non-transitory recording medium in which a program for allowing the computer to perform the support method is recorded. This recording medium can be stored in, for example, the controller 13 in FIG. 1. The embodiment of the present disclosure can also be said to relate to the plant operation support apparatus using a process simulator for calculating and displaying key performance indicator (KPI) of the task based on information from the plant.

The plant operation support apparatus of the present disclosure may be one of the following first to seventh plant operation support apparatuses.

In the plant operation support apparatus including the plant simulator for simulating the state at the current time or the predetermined time based on information obtained from the plant and outputting the estimated value at the current time or the predetermined time of the process data in the plant, and the predictor for predicting the state at the predetermined future time of the plant based on the estimated value and outputting the predicted value of the process data in the plant, the first plant support system is characterized by including the predicted KPI deriver for deriving the predicted KPI which is the index for monitoring the state at the future time of the task to be monitored in the plant operation based on the predicted value.

The second plant operation support apparatus is the first plant operation support apparatus characterized in that the predicted KPI deriver derives the each predicted KPI at a plurality of future times and displays the derived result.

The third plant operation support apparatus is the first or the second plant operation support apparatus including the estimated KPI deriver for deriving the estimated KPI which is the index for monitoring the state at the current time or the predetermined time of the task based on the estimated value, the KPI delta calculator for calculating the delta between the estimated KPI and the predicted KPI, and the KPI determiner for determining that the state at the future time of the task is normal when the delta is within the predefined range from the first threshold value to the second threshold value, and for determining that the state at the future time of the task is abnormal when the delta is out of the predefined range from the first threshold value to the second threshold value.

The fourth plant operation support apparatus is the first or the second plant operation support apparatus including the KPI determiner for determining that the state at the future time of the task is normal when the predicted KPI is within the range from the first threshold value to the second threshold value, and for determining that the state at the future time of the task is abnormal when the predicted KPI is out of the predefined range from the first threshold value to the second threshold value.

The fifth plant operation support apparatus is the third or the fourth plant operation support apparatus characterized in that when the KPI determiner determines that the state of the task is abnormal, the KPI determiner determines a degree of abnormality corresponding to a magnitude of the predicted KPI or an absolute value of a difference between the delta and a threshold value close to the delta or a value of the predicted KPI among the first threshold value or the second threshold value.

The sixth plant operation support apparatus is any one of the third to the fifth plant operation support apparatus characterized by further including a display for displaying the determination result at a plurality of future times as a predetermined symbol data based on the determination result determined by the KPI determiner, and for displaying the each delta or the each predicted KPI at the plurality of future times in time series in a graph form.

The seventh plant operation support apparatus is any one of the first to the sixth plant operation support apparatus characterized in that the estimated KPI or the predicted KPI is calculated from one or a plurality of predetermined parameters necessary to evaluate a state of the task among the estimated value or the predicted value.

Further, the plant operation support method of the present disclosure may be the following first or second plant operation support method.

In the plant operation support method including a plant simulator for simulating a state at a current time or a predetermined time of a plant based on information obtained from the plant and outputting an estimated value at the current time or the predetermined time of data of the plant, and a predictor for predicting a state at a predetermined future time of the plant based on the estimated value and outputting a predicted value of the data of the plant, the first plant operation support method is characterized by including the following steps: a step of deriving a predicted KPI which is an index for monitoring a state at the future time of a task to be monitored for plant operation based on the predicted value by the predictive KPI deriver, a step of calculating a delta between the estimated KPI and the predicted KPI by a KPI delta calculator, and a step of determining that a state at the future time of the task is normal by a KPI determiner when the delta is within a predefined range from a first threshold value to a second threshold value, and determining that the state at the future time of the task is abnormal by the KPI determiner when the delta is out of the predefined range from the first threshold value to the second threshold value. In the plant operation support method including a plant simulator for simulating a state at the present or the predetermined time of the plant based on information obtained from the plant and outputting an estimated value at the current time or the predetermined time of data of the plant, and a predictor for predicting a state at a predetermined future time of the plant based on the estimated value and outputting a predicted value of the data of the plant, the second plant operation support method is characterized by including the following steps: a step of deriving a predicted KPI which is an index for monitoring a state at the future time of a task to be monitored for plant operation based on the predicted value by the predictive KPI deriver, and a step of determining that a state at the future time of the task is normal by a KPI determiner when the predicted KPI is within a predefined range from a first threshold value to a second threshold value, and determining that the state at the future time of the task is abnormal by the KPI determiner when the predicted KPI is out of the predefined range from the first threshold value to the second threshold value.

Furthermore, a plant operation support program of the present disclosure may be the first or the second plant operation support program.

The first plant operation support program allows a computer to perform the following steps: a step of simulating a state at a current time or a predetermined time of a plant based on information obtained from the plant by a plant simulator and outputting an estimated value at the current time or the predetermined time of data of the plant, a step of predicting a state at a predetermined future time of the plant based on the estimated value by a predictor and outputting a predicted value of the data of the plant, a step of deriving a predicted KPI which is an index for monitoring a state at the future time of a task to be monitored for plant operation based on the predicted value by the predictive KPI deriver, a step of calculating a delta between the estimated KPI and the predicted KPI by a KPI delta calculator, and a step of determining that the state at the future time of the task is normal by a KPI determiner when the delta is within a predefined range from a first threshold value to a second threshold value, and determining that the state at the future time of the task is abnormal by the KPI determiner when the delta is out of the predefined range from the first threshold value to the second threshold value.

The second plant operation support program allows a computer to perform the following steps: a step of simulating a state at a current time or a predetermined time of a plant based on information obtained from the plant by a plant simulator and outputting an estimated value at the current time or the predetermined time of data of the plant, a step of predicting a state at a predetermined future time of the plant based on the estimated value by a predictor and outputting a predicted value of the data of the plant, a step of deriving a predicted KPI which is an index for monitoring a state at the future time of a task to be monitored for plant operation based on the predicted value by the predictive KPI deriver, and a step of determining that the state at the future time of the task is normal by a KPI determiner when the predicted KPI is within a predefined range from a first threshold value to a second threshold value, and determining that the state at the future time of the task is abnormal by the KPI determiner when the predicted KPI is out of the predefined range from the first threshold value to the second threshold value.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A plant operation support apparatus comprising:
   a plant simulator that simulates a state of a plant at a current time or a predetermined time based on information obtained from the plant, and outputs an estimated value of process data at the current time or the predetermined time;
   a predictor that predicts a state of the plant at a future time based on the estimated value and outputs a predicted value of the process data at the future time;
   a predicted key performance indicator (KPI) deriver that derives a predicted KPI of a task to be monitored in plant operation based on the predicted value, the predicted KPI being an index for monitoring the state of the task at the future time;
   an estimated KPI deriver that derives an estimated KPI of the task to be monitored in the plant operation, the estimated KPI being an index for monitoring a state of the task at the current time or the predetermined time based on the estimated value; and
   a KPI delta calculator that calculates a delta between the estimated KPI and the predicted KPI,
   a KPI determiner that determines that a state of the task at the future time is normal when the delta is in a range from a first threshold value to a second threshold value, and determines that the state of the task at the future time is abnormal when the delta is out of the range, and
   a display that displays a first display icon indicating that the state of the task at the current time or predetermined time is normal or a second display icon indicating that the state of the task at the current time or predetermined time is abnormal based on the estimated KPI and displays the first display icon indicating that the state of the task at the future time is normal or displays the second display icon indicating that the state of the task at the future time is abnormal based on the determination result of the KPI determiner, together with the calculated delta in a graph form on a same display.

2. The plant operation support apparatus according to claim 1, wherein the predicted KPI deriver derives a plurality of predicted KPI at a plurality of future times, and the display displays the derived plurality of predicted KPI.

3. The plant operation support apparatus according to claim 1, wherein when the KPI determiner determines that the state of the task is abnormal, the KPI determiner determines a degree of abnormality corresponding to a magnitude of the predicted KPI, corresponding to an absolute value of a difference between the delta and a threshold value close to the delta, or corresponding to a value of the predicted KPI among the first threshold value or the second threshold value, and
 the symbol data indicates the determined degree of abnormality.

4. The plant operation support apparatus according to claim 1, wherein the predicted KPI deriver derives a plurality of predicted KPI at a plurality of future times,
 the KPI delta calculator calculates a delta between the estimated KPI and the predicted KPI of the task at the plurality of future times,
 the predicted KPI determiner determines that a state of the task at each of the future times is normal or abnormal based on the calculated deltas, and
 the display displays the first display icon or the second display icon indicating the state of the task as normal or abnormal at the plurality of future times based on the determination result of the KPI determiner, and displays the calculated delta or the predicted KPI at the plurality of future times in the graph form.

5. The plant operation support apparatus according to claim 1, wherein the estimated KPI or the predicted KPI is calculated from a plurality of parameters in the process data.

6. The plant operation support apparatus according to claim 2, wherein the estimated KPI or the predicted KPI is calculated from a plurality of parameters in the process data.

7. A method comprising:
 simulating, by a plant simulator, a state of a plant at a current time or a predetermined time based on information obtained from the plant and outputting an estimated value of process data at the current time or the predetermined time;
 predicting, by a predictor, a state of the plant at a future time based on the estimated value and outputting a predicted value of the process data at the future time;
 deriving, by an estimated key performance indicator (KPI) deriver, an estimated KPI of a task to be monitored in plant operation, the estimated KPI being an index for monitoring the state of the task at the current time or the predetermined time based on the estimated value;
 deriving, by a predicted KPI deriver, a predicted KPI of the task to be monitored in the plant operation, the predicted KPI being an index for monitoring the state of the task at the future time based on the predicted value;
 calculating, by a KPI delta calculator, a delta between the estimated KPI and the predicted KPI;
 determining, by a KPI determiner, that a state of the task at the future time is normal when the delta is in a range from a first threshold value to a second threshold value, and determining that the state of the task at the future time is abnormal when the delta is out of the range; and
 displaying, on a display, a first display icon indicating that the state of the task at the current time or the predetermined time is normal or a second display icon indicating that the state of the task at the current time or the predetermined time is abnormal based on the estimated KPI and displaying, on the display, the first display icon indicating that the state of the task at the future time is normal or the second display icon indicating that the state of the task at the future time is abnormal based on the determination result of the KPI determiner together with the calculated delta in a graph form on the same display.

8. A non-transitory computer-readable recording medium storing a program which, when read and executed by a computer, performs steps comprising:
 a step of simulating a state of a plant at a current time or a predetermined time based on information obtained from the plant and outputting an estimated value of process data at the current time or the predetermined time;
 a step of predicting a state of the plant at a future time in the plant based on the estimated value and outputting a predicted value of the process data at the future time;
 a step of deriving an estimated KPI of a task to be monitored in plant operation, the estimated KPI being an index for monitoring the state of the task at the current time or the predetermined time based on the estimated value;
 a step of deriving a predicted KPI of the task to be monitored in the plant operation, the predicted KPI being an index for monitoring the state of the task at the future time based on the predicted value;
 a step of calculating a delta between the estimated KPI and the predicted KPI;
 a step of determining that a state of the task at the future time is normal when the delta is within a range from a first threshold value to a second threshold value, and determining that the state of the task at the future time is abnormal when the delta is out of the range; and
 a step of displaying, on a display of the computer, a first display icon indicating that the state of the task at the current time or the predetermined time is normal or a second display icon indicating that the state of the task at the current time or the predetermined time is abnormal based on the estimated KPI and displaying, on the display, the first display icon indicating that the state of the task at the future time is normal or the second display icon indicating that the state of the task at the future time is abnormal based on the determination result of the KPI determiner together with the calculated delta in a graph form on the same display.

9. The plant operation support apparatus according to claim 1, wherein the state of the task comprises one or more of a safety of plant operation of the plant associated with the task, a product quality of the plant associated with the task, a production amount of the plant associated with the task, a production efficiency of the plant associated with the task, and an environmental load of the plant associated with the task.

10. The plant operation support apparatus according to claim 1, wherein the KPI combines a first conditional expression for a parameter of the estimated value and a second conditional expression for a parameter of the predicted value.

11. The method according to claim 7, wherein:
 the predicted KPI deriver derives a plurality of predicted KPI at a plurality of future times,
 the KPI delta calculator calculates a delta between the estimated KPI and the predicted KPI of the task at the plurality of future times,
 the predicted KPI determiner determines that a state of the task at each of the future times is normal or abnormal based on the calculated deltas, and the displaying comprises displaying symbol data indicating the state of the task as normal or abnormal at the plurality of future times based on the determination result of the KPI determiner, and displaying the calculated delta or the predicted KPI at the plurality of future times in graph form.

12. The non-transitory computer-readable recording medium according to claim 8, wherein:
the step of deriving the predicted KPI derives a plurality of predicted KPI at a plurality of future times,
the step of calculating the delta calculates a delta between the estimated KPI and the predicted KPI of the task at the plurality of future times,
the step of determining that the state of the task is normal or abnormal determines that a state of the task at each of the future times is normal or abnormal based on the calculated deltas, and
the step of displaying displays the first display icon or the second display icon indicating the state of the task as normal or abnormal at the plurality of future times based on the determination result of the KPI determiner, and displays the calculated delta or the predicted KPI at the plurality of future times in the graph form.

* * * * *